(12) United States Patent
Marchand et al.

(10) Patent No.: US 8,324,846 B2
(45) Date of Patent: Dec. 4, 2012

(54) ELECTRIC DRIVE RETARDING SYSTEM AND METHOD

(75) Inventors: David G. Marchand, Dunlap, IL (US); Matthew E. Williams, East Peoria, IL (US); Gerald Brown, Cedarville, OH (US); John Gunzburger, Channahon, IL (US)

(73) Assignee: Caterpillar Inc., Peoria, IL (US)

( * ) Notice: Subject to any disclaimer, the term of this patent is extended or adjusted under 35 U.S.C. 154(b) by 587 days.

(21) Appl. No.: 12/210,891

(22) Filed: Sep. 15, 2008

(65) Prior Publication Data
US 2010/0066280 A1 Mar. 18, 2010

(51) Int. Cl.
*H02P 3/12* (2006.01)

(52) U.S. Cl. ........ 318/380; 318/362; 318/375; 318/379; 903/947

(58) Field of Classification Search .......... 318/362, 318/375, 379, 380; 903/947
See application file for complete search history.

(56) References Cited

U.S. PATENT DOCUMENTS

| | | | |
|---|---|---|---|
| 2,279,407 A | 8/1942 | McCune | |
| 2,409,099 A | 10/1946 | Bloomfield | |
| 2,482,840 A | 9/1949 | Collins et al. | |
| 2,520,204 A | 8/1950 | Hancock | |
| 2,633,541 A * | 3/1953 | Justus | 290/9 |
| 3,216,769 A | 11/1965 | Hicks et al. | |
| 3,250,973 A | 5/1966 | Dawson | |
| 3,259,216 A | 7/1966 | Klaus et al. | |
| 3,370,218 A | 2/1968 | Merz | |
| 3,410,375 A | 11/1968 | Schmidt | |
| 3,495,404 A | 2/1970 | Thompson | |
| 3,562,565 A | 2/1971 | Higashino | |
| 3,670,225 A * | 6/1972 | Kitaoka et al. | 318/270 |
| 3,670,854 A | 6/1972 | Maci | |
| 3,696,893 A | 10/1972 | Koivunen | |
| 3,730,596 A | 5/1973 | Felix et al. | |
| 3,774,095 A | 11/1973 | Coccia | |
| 3,944,287 A | 3/1976 | Nagase | |
| 3,992,062 A | 11/1976 | Jeffrey et al. | |

(Continued)

FOREIGN PATENT DOCUMENTS
EP 1610454 A1 12/2005
(Continued)

OTHER PUBLICATIONS

European Patent Office, International Search Report in International Patent Application No. PCT/US2009/043421 (Apr. 16, 2010).

(Continued)

*Primary Examiner* — Kawing Chan
(74) *Attorney, Agent, or Firm* — Leydig, Voit & Mayer

(57) ABSTRACT

A retarding system for an electric drive machine (100) includes a direct current (DC) link (312), at which a DC voltage is developed, disposed between a rectifier (206) and an inverter (208). A first contactor switch (216) electrically communicates with a first rail of the DC link (312), and a second contactor switch (216) electrically communicates with a second rail of the DC link (312). A first resistor grid (214) is connected in series between the first contactor switch (216) and the second contactor switch (216). The first resistor grid (214) dissipates electrical energy in the form of heat by conducting a current between the first rail and the second rail of the DC link (312) when the first contactor switch (216) and the second contactor switch (216) are closed.

13 Claims, 6 Drawing Sheets

U.S. PATENT DOCUMENTS

| Patent No. | | Date | Inventor(s) | Ref. |
|---|---|---|---|---|
| 4,031,440 | A | 6/1977 | Christian et al. | |
| 4,051,421 | A * | 9/1977 | Brinner et al. | 318/367 |
| 4,054,821 | A | 10/1977 | Williamson | |
| 4,083,469 | A | 4/1978 | Schexnayder | |
| 4,095,152 | A * | 6/1978 | Narita | 318/376 |
| 4,128,793 | A * | 12/1978 | Stich | 318/808 |
| 4,143,280 | A | 3/1979 | Kuehn, Jr. et al. | |
| 4,181,366 | A | 1/1980 | Dobner | |
| 4,270,806 | A | 6/1981 | Venkataperumal et al. | |
| 4,280,073 | A | 7/1981 | Miller | |
| 4,292,531 | A | 9/1981 | Williamson | |
| 4,313,517 | A | 2/1982 | Pivar | |
| 4,393,338 | A * | 7/1983 | Jones et al. | 318/86 |
| 4,482,813 | A | 11/1984 | Grand-Perret et al. | |
| 4,495,449 | A | 1/1985 | Black et al. | |
| 4,555,652 | A * | 11/1985 | Brulard | 318/375 |
| 4,651,071 | A | 3/1987 | Imanaka | |
| 4,659,149 | A | 4/1987 | Rumsey et al. | |
| 4,671,577 | A | 6/1987 | Woods | |
| 4,698,561 | A | 10/1987 | Buchanan et al. | |
| 4,772,829 | A | 9/1988 | Pickering et al. | |
| 4,938,321 | A | 7/1990 | Kelley et al. | |
| 4,962,969 | A | 10/1990 | Davis | |
| 4,965,513 | A | 10/1990 | Haynes et al. | |
| 5,103,923 | A | 4/1992 | Johnston et al. | |
| 5,135,097 | A * | 8/1992 | Saito et al. | 198/330 |
| 5,139,121 | A | 8/1992 | Kumura et al. | |
| 5,222,787 | A | 6/1993 | Eddy et al. | |
| 5,280,223 | A | 1/1994 | Grabowski et al. | |
| 5,293,966 | A | 3/1994 | Chareire | |
| 5,302,008 | A | 4/1994 | Miyake et al. | |
| 5,322,147 | A | 6/1994 | Clemens | |
| 5,323,095 | A | 6/1994 | Kumar | |
| 5,351,775 | A * | 10/1994 | Johnston et al. | 180/65.31 |
| 5,355,978 | A | 10/1994 | Price et al. | |
| 5,362,135 | A | 11/1994 | Riddiford et al. | |
| 5,378,053 | A | 1/1995 | Patient et al. | |
| 5,432,413 | A | 7/1995 | Duke et al. | |
| 5,450,324 | A | 9/1995 | Cikanek | |
| 5,469,943 | A | 11/1995 | Hill et al. | |
| 5,472,264 | A | 12/1995 | Klein et al. | |
| 5,476,310 | A | 12/1995 | Ohtsu et al. | |
| 5,492,192 | A | 2/1996 | Brooks et al. | |
| 5,511,859 | A | 4/1996 | Kade et al. | |
| 5,523,701 | A | 6/1996 | Smith et al. | |
| 5,539,641 | A | 7/1996 | Littlejohn | |
| 5,551,764 | A | 9/1996 | Kircher et al. | |
| 5,573,312 | A | 11/1996 | Müller et al. | |
| 5,615,933 | A | 4/1997 | Kidston et al. | |
| 5,629,596 | A | 5/1997 | Iijima et al. | |
| 5,632,534 | A | 5/1997 | Knechtges | |
| 5,707,115 | A | 1/1998 | Bodie et al. | |
| 5,747,959 | A * | 5/1998 | Iijima et al. | 318/762 |
| 5,754,450 | A | 5/1998 | Solomon et al. | |
| 5,755,302 | A | 5/1998 | Lutz et al. | |
| 5,769,509 | A | 6/1998 | Feigel et al. | |
| 5,775,784 | A | 7/1998 | Koga et al. | |
| 5,814,956 | A * | 9/1998 | Kono et al. | 318/380 |
| 5,832,395 | A | 11/1998 | Takeda et al. | |
| 5,839,800 | A | 11/1998 | Koga et al. | |
| 5,853,229 | A | 12/1998 | Willmann et al. | |
| 5,951,115 | A | 9/1999 | Sakai et al. | |
| 5,961,190 | A | 10/1999 | Brandmeier et al. | |
| 5,962,997 | A | 10/1999 | Maisch | |
| 5,983,149 | A | 11/1999 | Tate et al. | |
| 6,076,899 | A | 6/2000 | Isella | |
| 6,078,173 | A | 6/2000 | Kumar et al. | |
| 6,081,086 | A * | 6/2000 | Roth-Stielow et al. | 318/375 |
| 6,087,791 | A | 7/2000 | Maruyama | |
| 6,120,115 | A | 9/2000 | Manabe | |
| 6,158,822 | A | 12/2000 | Shirai et al. | |
| 6,213,567 | B1 | 4/2001 | Zittlau et al. | |
| 6,226,586 | B1 | 5/2001 | Luckevich et al. | |
| 6,231,134 | B1 | 5/2001 | Fukasawa et al. | |
| 6,242,873 | B1 | 6/2001 | Drozdz et al. | |
| 6,318,487 | B2 | 11/2001 | Yanase et al. | |
| 6,325,470 | B1 | 12/2001 | Schneider | |
| 6,392,418 | B1 | 5/2002 | Mir et al. | |
| 6,425,643 | B2 | 7/2002 | Shirai et al. | |
| 6,441,573 | B1 | 8/2002 | Zuber et al. | |
| 6,456,909 | B1 | 9/2002 | Shimada et al. | |
| 6,457,784 | B1 | 10/2002 | Böhm et al. | |
| 6,488,344 | B2 | 12/2002 | Huls et al. | |
| 6,547,343 | B1 | 4/2003 | Hac | |
| 6,560,515 | B2 | 5/2003 | Inoue | |
| 6,663,197 | B2 | 12/2003 | Joyce | |
| 6,664,653 | B1 | 12/2003 | Edelman | |
| 6,687,593 | B1 | 2/2004 | Crombez et al. | |
| 6,709,075 | B1 | 3/2004 | Crombez et al. | |
| 6,724,165 | B2 | 4/2004 | Hughes | |
| 6,771,040 | B2 | 8/2004 | Kusumoto | |
| 6,815,933 | B2 | 11/2004 | Taniguchi et al. | |
| 6,885,920 | B2 | 4/2005 | Yakes et al. | |
| 6,910,747 | B2 | 6/2005 | Tsunehara | |
| 6,933,692 | B2 | 8/2005 | Gabriel et al. | |
| 6,959,971 | B2 | 11/2005 | Tsunehara | |
| 6,986,727 | B2 | 1/2006 | Kuras et al. | |
| 7,029,077 | B2 | 4/2006 | Anwar et al. | |
| 7,059,691 | B2 | 6/2006 | Tsunehara et al. | |
| 7,104,617 | B2 | 9/2006 | Brown | |
| 7,136,737 | B2 | 11/2006 | Ashizawa et al. | |
| 7,185,591 | B2 | 3/2007 | Kumar et al. | |
| 7,290,840 | B2 | 11/2007 | Tsunehara et al. | |
| 7,308,352 | B2 | 12/2007 | Wang et al. | |
| 7,311,163 | B2 | 12/2007 | Oliver | |
| 7,330,012 | B2 | 2/2008 | Ahmad et al. | |
| 7,378,808 | B2 | 5/2008 | Kuras et al. | |
| 7,385,372 | B2 | 6/2008 | Ahmad et al. | |
| 8,148,925 | B2 * | 4/2012 | Jobard et al. | 318/376 |
| 2001/0024062 | A1 | 9/2001 | Yoshino | |
| 2002/0043962 | A1 | 4/2002 | Taniguchi et al. | |
| 2002/0050739 | A1 | 5/2002 | Koepff et al. | |
| 2002/0117984 | A1 | 8/2002 | Zuber et al. | |
| 2003/0132039 | A1 | 7/2003 | Gaffney et al. | |
| 2003/0149521 | A1 | 8/2003 | Minowa et al. | |
| 2003/0151387 | A1 | 8/2003 | Kumar | |
| 2003/0169002 | A1 | 9/2003 | Hughes | |
| 2003/0223738 | A1 * | 12/2003 | Hughes et al. | 388/800 |
| 2004/0090116 | A1 | 5/2004 | Tsunehara | |
| 2004/0100274 | A1 * | 5/2004 | Gloster et al. | 324/536 |
| 2004/0108789 | A1 | 6/2004 | Marshall | |
| 2004/0162696 | A1 * | 8/2004 | Kumar | 702/132 |
| 2004/0239180 | A1 | 12/2004 | Foust | |
| 2004/0251095 | A1 | 12/2004 | Simard et al. | |
| 2005/0005814 | A1 * | 1/2005 | Kumar et al. | 105/35 |
| 2005/0099146 | A1 | 5/2005 | Nishikawa et al. | |
| 2006/0047400 | A1 | 3/2006 | Prakash et al. | |
| 2006/0055240 | A1 | 3/2006 | Toyota et al. | |
| 2006/0086547 | A1 | 4/2006 | Shimada et al. | |
| 2006/0089777 | A1 | 4/2006 | Riddiford et al. | |
| 2006/0102394 | A1 | 5/2006 | Oliver | |
| 2006/0119177 | A1 * | 6/2006 | Kumar et al. | 307/9.1 |
| 2006/0131888 | A1 * | 6/2006 | Ahmad et al. | 290/40 C |
| 2007/0016340 | A1 | 1/2007 | Soudier et al. | |
| 2007/0144398 | A1 | 6/2007 | Kumar et al. | |
| 2007/0145918 | A1 * | 6/2007 | Kumar et al. | 318/139 |
| 2007/0182359 | A1 | 8/2007 | Wahler | |
| 2008/0084229 | A1 | 4/2008 | Frommer et al. | |
| 2009/0293760 | A1 * | 12/2009 | Kumar et al. | 105/59 |

FOREIGN PATENT DOCUMENTS

| | | | |
|---|---|---|---|
| JP | 62-081901 A | | 4/1987 |
| JP | 03295173 A | * | 12/1991 |
| JP | 06046505 A | * | 2/1994 |

OTHER PUBLICATIONS

European Patent Office, Written Opinion of the International Searching Authority in International Patent Application No. PCT/US2009/043421 (Apr. 16, 2010).

* cited by examiner

ELECTRIC DRIVE RETARDING SYSTEM AND METHOD

TECHNICAL FIELD

This patent disclosure relates generally to retarding systems and methods for electric drives and more particularly, to retarding systems and methods that dissipate retard energy in the form of heat.

BACKGROUND

Electric drive systems for machines typically include a power circuit that selectively activates a motor at a desired torque. The motor is typically connected to a wheel or other traction device that operates to propel the machine. A hybrid drive system includes a prime mover, for example, an internal combustion engine, that drives a generator. The generator produces electrical power that is used to drive the motor. When the machine is propelled, mechanical power produced by the engine is converted to electrical power at the generator. This electrical power is often processed and/or conditioned before being supplied to the motor. The motor transforms the electrical power back into mechanical power to drive the wheels and propel the vehicle.

The machine is retarded in a mode of operation during which the operator desires to decelerate the machine. To retard the machine in this mode, the power from the engine is reduced. Typical machines also include brakes and some type of retarding mechanism to decelerate and/or stop the machine. As the machine decelerates, the momentum of the machine is transferred to the motor via rotation of the wheels. The motor acts as a generator to convert the kinetic energy of the machine to electrical power that is supplied to the drive system. This electrical energy can be dissipated through wasting, storage, or other consumption by the system in order to absorb the machine's kinetic energy.

A typical electrical retarding system includes a series of resistors or other impedance devices, through which thermal energy is dissipated when electrical current passes therethrough. Due to the size of the machine components and the magnitude of the momentum retarded, large amounts of thermal energy may be dissipated through these impedance devices, which would greatly elevate their temperature. Accordingly, various solutions in the past have involved utilizing active cooling systems to reduce the temperature of these devices. Forced convection by use of a fan or blower provides one form of active cooling for impedance devices used in electric retarding systems.

Known systems using fans or blowers include an electrically driven fan that creates an airflow passing over the impendence devices to cool them by forced convection. Such motors are typically DC motors that operate at a certain DC voltage, which is supplied from the drive system. To regulate this voltage, past systems have included transformers with taps in the generator of the system, high voltage isolators, and so forth. These systems, however, are somewhat costly and deprive the drive system of useful electrical power during operation. They also tend to reduce the overall efficiency of the machine.

SUMMARY

The disclosure describes, in one aspect, a retarding system for an electric drive machine. The retarding system includes a direct current (DC) link, disposed between a rectifier and an inverter, at which a DC voltage is developed. A first contactor switch electrically communicates with a first rail of the DC link, and a second contactor switch electrically communicates with a second rail of the DC link. A first resistor grid is connected in series between the first contactor switch and the second contactor switch. The first resistor grid dissipates electrical energy in the form of heat by conducting a current between the first rail and the second rail of the DC link when the first contactor switch and the second contactor switch are closed. In this way, converted kinetic energy may be dissipated while the machine is retarded.

In another aspect, the disclosure describes an electric drive machine that includes an engine having an output, a generator connected to the output of the engine, a rectifier connected to the generator, and an inverter connected to the rectifier. A DC link electrically connects the rectifier with the inverter. At least one motor is connected to the inverter and operates to drive at least one drive wheel. A first contactor switch and a second contactor switch are connected to the DC link and have a first resistor grid connected between them. In a propel mode, the generator supplies power to the rectifier to develop a DC link voltage at the DC link, and the inverter converts the DC link voltage to an alternating voltage, which in turn is applied to the at least one motor of the machine. In a retard mode, a waste power flow path is defined, at least partially, by the at least one drive wheel, the at least one motor, the inverter, and the first resistor grid when the first contactor switch and the second contactor switch are in a closed position.

In yet another aspect, the disclosure describes a method for retarding an electric drive machine having a DC voltage developed at a DC link. The method includes determining a magnitude of a retarding command and comparing the magnitude to a threshold. When the magnitude is less than the threshold, a chopper circuit and at least one resistor grid are placed in circuit with the DC link. The DC link voltage is compared to a reference value. When the magnitude of the retarding command exceeds the threshold and the voltage is below the reference value, two contactor switches are activated to place an additional resistor grid in circuit with the DC link. When the magnitude of the retarding command is below the threshold and the voltage is above the reference value, the chopper is activated to reduce the voltage below the reference value. The two contactor switches are activated if the DC link voltage has dropped below the reference value, and at least one traction motor is selectively regenerated to maintain stability of the DC link voltage.

DETAILED DESCRIPTION

This disclosure relates to systems and methods for retarding an electric drive machine or vehicle. The disclosure that follows uses an example of a direct series electric drive electric vehicle having an engine connected to a generator for producing electrical power that drives the vehicle. In the exemplary embodiments presented, excess electrical energy produced when the machine is retarded is dissipated in the form of heat. The systems and methods disclosed herein have applicability to other electric drive vehicles. For example, a machine or vehicle may include an electric drive with power stored in one or more batteries or other storage devices, instead of being generated by an engine driven generator. This embodiment may store excess power produced during retarding in the batteries or other mechanical energy storage devices and arrangements rather than dissipating it in the form of heat.

Figure 1A:
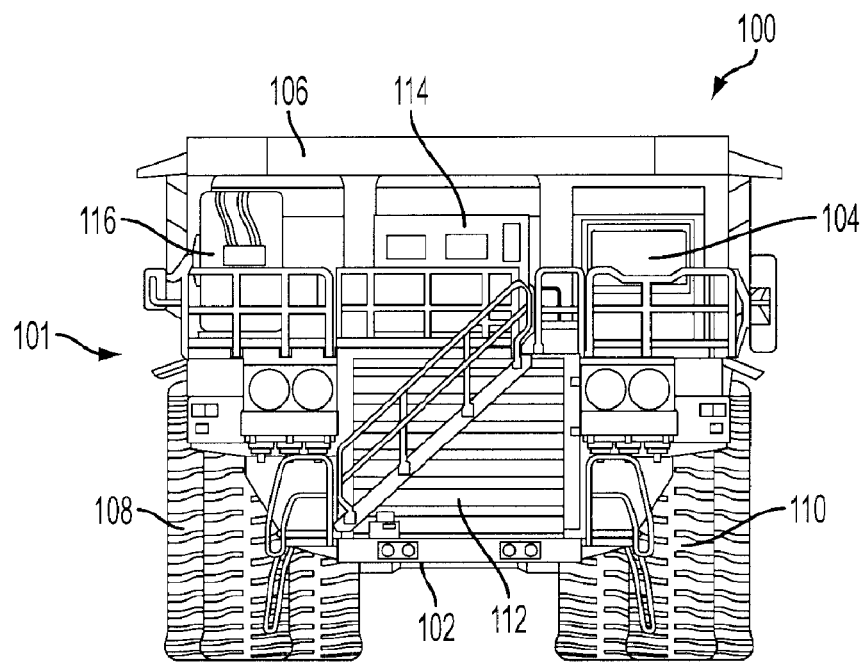
FIGS. 1A and 1B are, respectively, a front view and a side view of a machine in accordance with the disclosure.
Figure 1B:
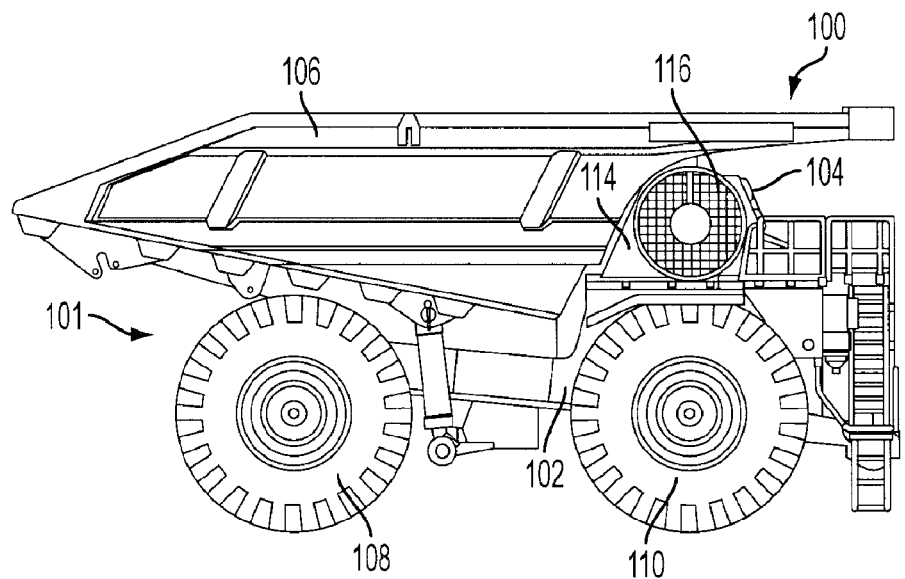

FIG. 1A and FIG. 1B illustrate, respectively, a front and a side view of a machine 100. The machine 100 is a direct series electric drive machine. One example of the machine 100 is an off-highway truck 101 such as those used for construction, mining, or quarrying. In the description that follows, this example illustrates the various arrangements that can be used on machines having direct series electric drive systems. As can be appreciated, any other vehicle having a direct series electric drive or electric-only arrangement can benefit from the advantages described herein. The term "machine," therefore, is used to generically describe any machine having at least one drive wheel that is driven by a motor connected to the wheel. Electrical power may be generated onboard by a generator, alternator, or another power-generation device, which may be driven by an engine or other prime mover. Alternatively, electrical power may be stored but not generated on-board.

A front view of the off-highway truck 101 is shown in FIG. 1A, and a side view is shown in FIG. 1B. The off-highway truck 101 includes a chassis 102 that supports an operator cab 104 and a bucket 106. The bucket 106 is pivotally connected to the chassis 102 and is arranged to carry a payload when the off-highway truck 101 is in service. An operator occupying the operator cab 104 can control the motion and the various functions of the off-highway truck 101. The chassis 102 supports various drive system components. These drive system components are capable of driving a set of drive wheels 108 to propel the off-highway truck 101. A set of idle wheels 110 can steer such that the off-highway truck 101 can move in any direction. Even though the off-highway truck 101 includes a rigid chassis with powered wheels for motion and steerable wheels for steering, one can appreciate that other machine configurations can be used. For example, such configurations may include articulated chassis with one or more driven wheels.

Figure 2:
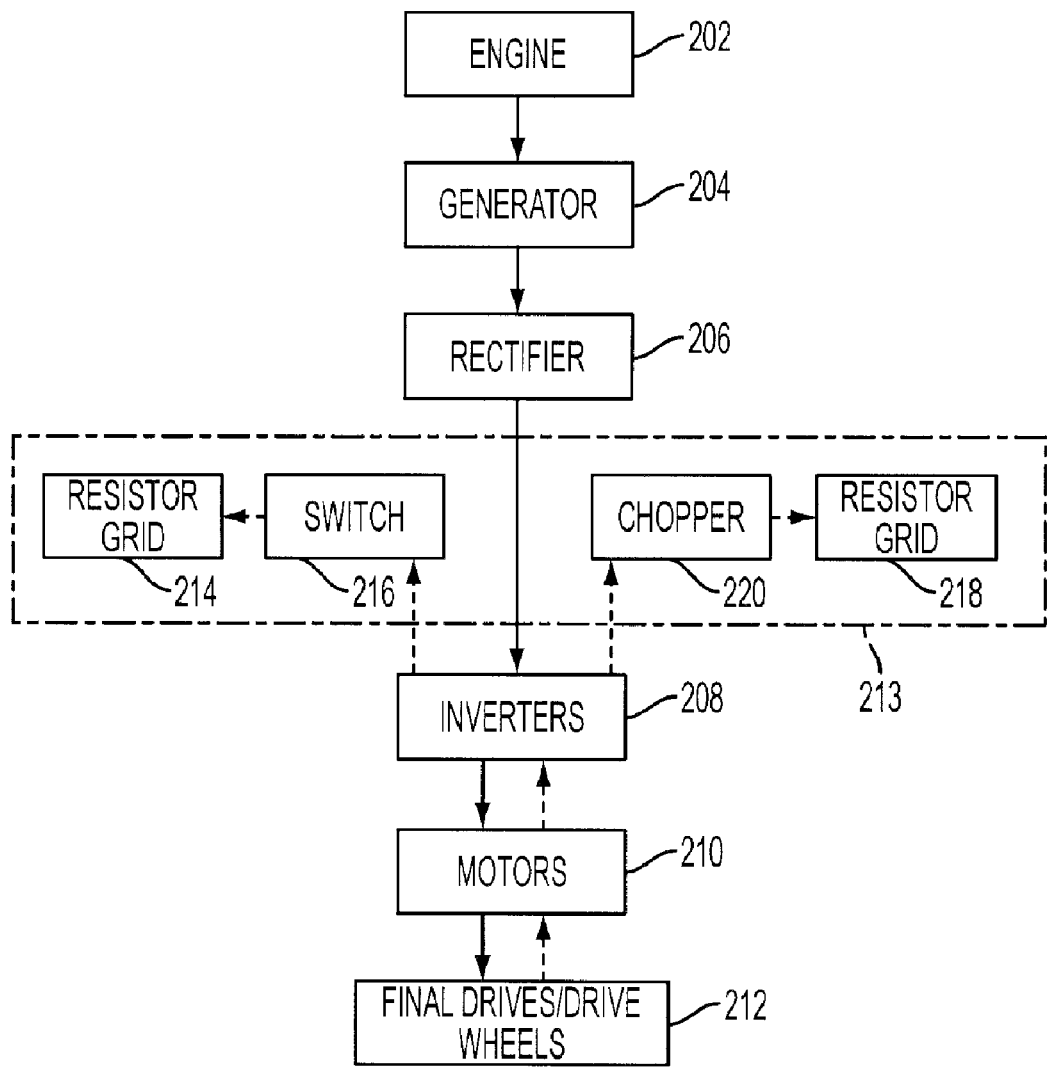
FIG. 2 is a block diagram of a direct series electric drive system for a machine in accordance with the disclosure.

The off-highway truck 101 is a direct series electric drive machine, which in this instance refers to the use of more than one source or form of power to drive the drive wheels 108. A block diagram for the direct series electric drive system of the machine 100, for example, the off-highway truck 101, is shown in FIG. 2. In the block diagram, the flow direction of power in the system when the machine is propelled is denoted by solid-lined arrows. Conversely, the flow of power during a retarding mode is shown in dash-lined arrows. The direct series electric drive system includes an engine 202, for example, an internal combustion engine such as a diesel engine, which produces an output torque at an output shaft (not shown). The output shaft of the engine 202 is connected to a generator 204. In operation, the output shaft of the engine 202 rotates a rotor of the generator 204 to produce electrical power, for example, in the form of alternating current (AC) power. This electrical power is supplied to a rectifier 206 and converted to direct current (DC) power. The rectified DC power may be converted again to AC power by an inverter circuit 208. The inverter circuit 208 may be capable of selectively adjusting the frequency and/or pulse-width of its output, such that motors 210 that are connected to an output of the inverter circuit 208 may be operated at variable speeds. The motors 210 may be connected via final assemblies (not shown) or directly to drive wheels 212 of the machine 100.

When the off-highway truck 101 is propelled, the engine 202 generates mechanical power that is transformed into electrical power, which is conditioned by various electrical components. In an illustrated embodiment, such components are housed within a cabinet 114 (FIG. 1A). The cabinet 114 is disposed on a platform that is adjacent to the operator cab 104 and may include the rectifier 206 (FIG. 2), inverter circuit 208 (FIG. 2), and/or other components. When the off-highway truck 101 is to be decelerated or its motion is otherwise to be retarded, for example, to prevent acceleration of the machine when travelling down an incline, its kinetic energy is converted to electrical energy. Effective disposition of this generated electrical power enables effective retarding of the off-highway truck 101.

Specifically, when the machine 100 is retarding, the kinetic energy of the machine 100 is transferred into rotational power of the drive wheels that rotates the motors 210, which act as electrical generators. The electrical power generated by the motors 210 has an AC waveform. Because the inverter circuit 208 is a bridge inverter, power supplied by the motors 210 is rectified by the inverter circuit 208 into DC power. Dissipation of the DC power generated by the motors 210 produces a counter-rotational torque at the drive wheels 108 to decelerate the machine. Dissipation of this DC power may be accomplished by passing the generated current rectified by the inverter circuit 208 through a resistance. To accomplish this, a retarder arrangement 213 may include a first resistor grid 214, described in greater detail below, that is arranged to receive current from the inverter circuit 208 via a switch 216. When the switch 216 is closed, the electrical power corresponding to the current generated by the motors 210 may pass through the first resistor grid 214 and dissipate as heat. Additionally, excess electrical power is also dissipated as heat as it passes through a second resistor grid 218, which is arranged to receive electrical power via a chopper circuit 220. The chopper circuit 220 operates to selectively route a portion of the developed electrical power through the second resistor grid 218. One embodiment for the drive and retarding system is described in more detail below.

Figure 3:
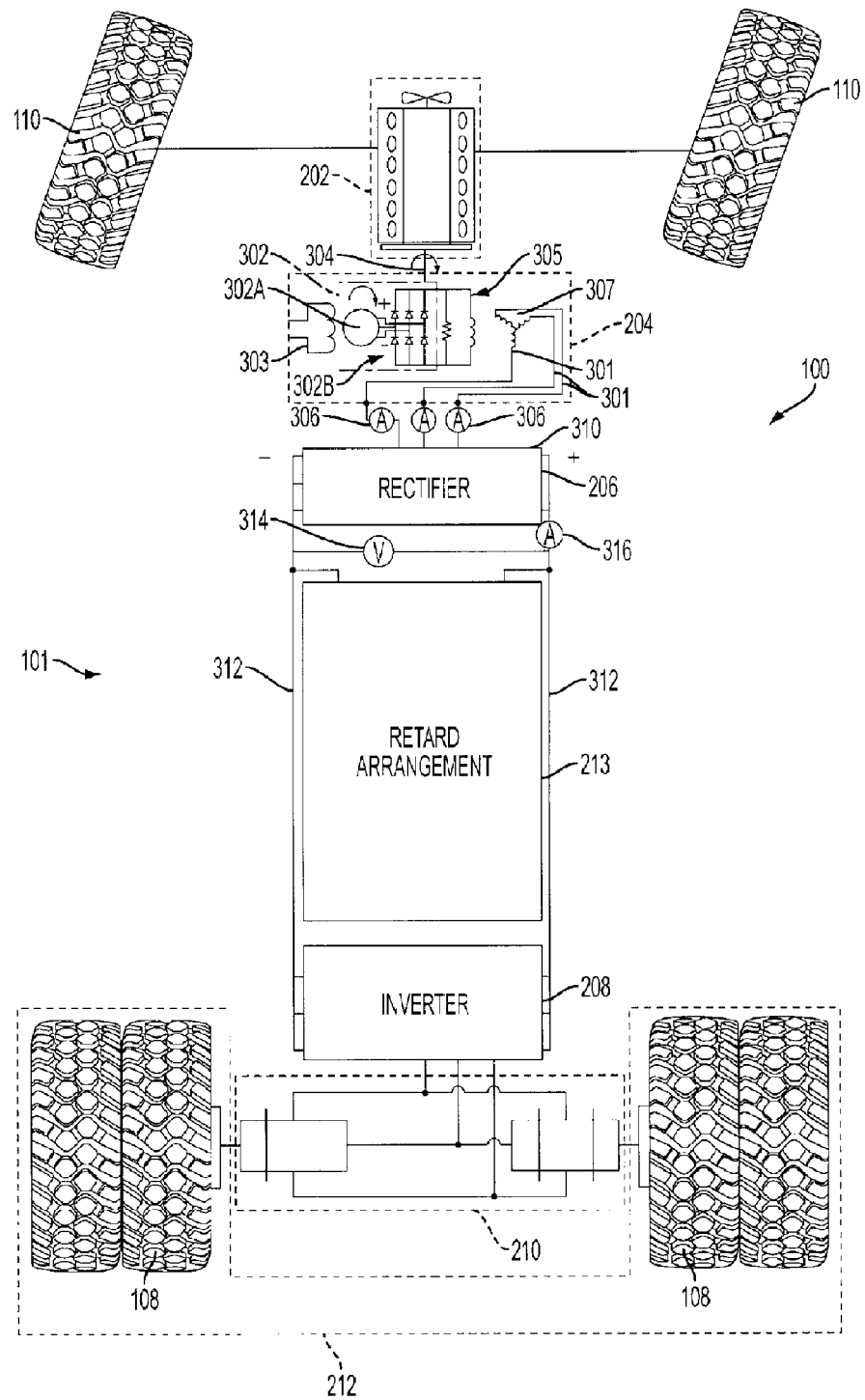
FIG. 3 is a block diagram for a drive and retarding system in accordance with the disclosure.
Figure 4:
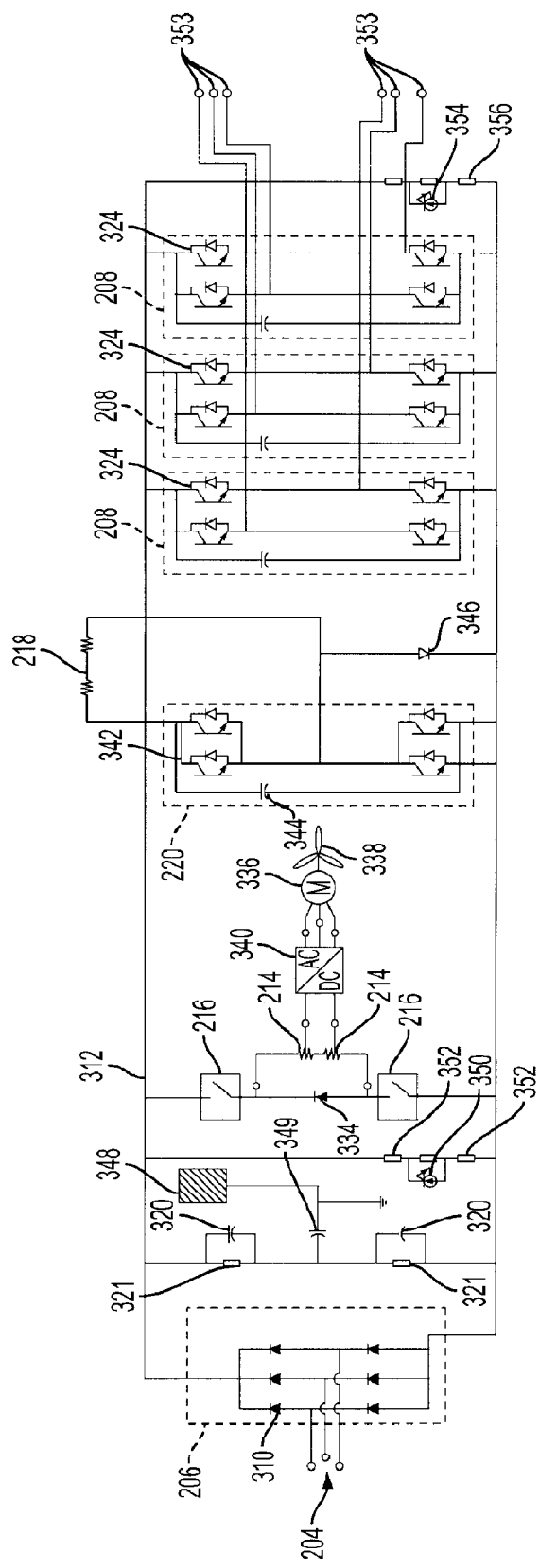
FIG. 4 is a simplified block diagram for the drive and retarding system shown in FIG. 3.

A block diagram of the direct series electric diesel electric drive system of the off-highway truck 101, as one example for the machine 100, is shown in FIG. 3 and FIG. 4. In these views, elements that were previously described are denoted by the same reference numerals for the sake of simplicity. Further, the block diagram of FIG. 4 includes a particular embodiment with component examples that can be included in the functional blocks shown in FIG. 3. Hence, the block diagrams shown in FIG. 3 and FIG. 4 should be referred to together when considering the description that follows. As shown, the engine 202 is connected to the generator 204 (shown in FIG. 3) via an output drive shaft 304. Even though a direct connection to the output drive shaft 304 is shown, other drive components, such as a transmission or other gear arrangements, may be utilized to couple the output of the engine 202 to the generator 204. The generator 204 may be any appropriate type of generator or alternator known in the power generation art.

In one embodiment, the generator 204 is a three-phase alternating current (AC) synchronous generator having a brushless, wound rotor. The generator 204 has an output 301 for each of three phases of alternating current being generated, with each output having a respective current transducer 306 connected thereto. The rotor of the generator 204 (shown in FIG. 3) includes a rotating rectifier 302 that is connected to a rotating exciter armature 302A. The rotating exciter armature 302A is energized by an excitation field produced by an excitation winding 303. Thus, the application of an excitation signal at the input to the excitation winding 303 creates an excitation field to activate the generator field 305. The generator field 305, in turn, produces the output available at three leads of the armature 307 of the generator 204.

In the illustrated embodiment, the rotating rectifier 302 includes a rotating exciter armature 302A that is connected to a series of rotating diodes 302B. The three current outputs of the generator 204, which are collectively considered the output of the generator 204, are connected to a rectifier 206. Other generator arrangements may alternatively be used.

The rectifier 206 converts the AC power supplied by the generator 204 into DC power. Any type of rectifier 206 may be used. The rectifier 206 converts the AC power supplied by the generator 204 into DC power. Any type of rectifier 206 may be used. In the example shown, the rectifier 206 is a poly-phase diode bridge, and in particular is a three phase full bridge rectifier 206. The illustrated rectifier 206 includes three parallel pairs of power diodes 310, each pair being associated with a given phase of the output of the generator 204. Each such diode pair includes two power diodes 310 connected in series across the DC link 312, with the selected output of the generator 204 providing a power input between each pair.

When power is supplied from the output of the three phase generator 204, the rectifier 206 operates to provide full wave rectification of each of the phases of the three-phase alternating current. The rectifier 206 develops a voltage across a DC linkage or DC link 312. This DC link voltage is available at a first rail and a second rail of the DC link 312. The first rail is typically at a first voltage and the second rail is typically at a second voltage during operation. Either of the first and second voltages may be zero.

During operation, a voltage is developed across the first and second rails of the DC link 312 by the rectifier 206 and/or an inverter circuit 208. One or more capacitors 320 may be connected in parallel with one or more resistors 321 across the DC link 312 to smooth the voltage V across the first and second rails of the DC link 312. The DC link 312 exhibits a DC link voltage, V, which can be measured by a voltage transducer 314, and a current, A, which can be measured by a current transducer 316, as shown in FIG. 3.

The inverter circuit 208 is connected in parallel with the rectifier 206 and operates to transform the DC voltage V into variable frequency sinusoidal or non-sinusoidal AC power that drives, in this example, two drive motors 210 (FIG. 3). Any known inverter may be used for the arrangement of the inverter circuit 208. In the example shown in FIG. 4, the inverter circuit 208 includes three phase arrays of insulated-gate bipolar transistors (IGBT) 324 that are arranged in transistor pairs and that are configured to supply a 3-phase AC output to each drive motor 210.

The inverter circuit 208 can control the speed of the motors 210 by controlling the frequency and/or the pulse-width of the AC output. The drive motors 210 may be directly connected to the drive wheels 108 or may power final drives that power the drive wheels 212. Final drives, as is known, operate to reduce the rate of rotation and increase the torque between each drive motor 210 and each set of drive wheels 212.

In alternative embodiments, the engine 202 and generator 204 are not required to supply the power necessary to drive the drive motors 210. Instead, such alternative embodiments use another source of power, such as a battery or contact with an electrified rail or cable. In some embodiments, one drive motor 210 may be used to power all drive wheels of the machine, while in other embodiments, any number of drive motors may be used to power any number of drive wheels, including all wheels connected to the machine.

Returning now to the block diagrams of FIG. 3 and FIG. 4, when the machine 100 operates in an electric braking mode, which is also known as electric retarding, less power is supplied from the generator 204 to the DC link 312. Because the machine is travelling at some non-zero speed, rotation of the drive wheels 108 due to the kinetic energy of the machine 100 will power the drive motors 210. The drive motors 210, in this mode, act as generators by producing AC electrical power. Consumption or disposition of this electrical power will consume work and act to apply a counter-rotational torque on the drive wheels 108, causing them to reduce their rotational speed, thus retarding the machine.

The generated AC electrical power can be converted into DC electrical power through the inverter circuit 208 for eventual consumption or disposition, for example, in the form of heat. In an illustrated embodiment, a retarder arrangement 213 consumes such electrical power generated during retarding. The retarder arrangement 213 can include any suitable arrangement that will operate to dissipate electrical power during retarding of the machine. In the exemplary embodiments shown in FIG. 4, the retarder arrangement 213 includes a first resistor grid 214 that is arranged to dissipate electrical energy at a fixed rate. The retarder arrangement 213 also includes a second resistor grid 218, to which DC current is supplied at a selectively variable rate by use of a pulse width modulator (PWM) or chopper circuit 220. In this way, the second resistor grid 218 dissipates electrical energy at a variable rate.

When the machine 100 is to operate in a retarding mode, the first resistor grid 214 is connected between the first and second rails of the DC link 312 so that current may be passed therethrough. When the machine 100 is being propelled, however, the first resistor grid 214 is electrically isolated from the DC link 312 by two contactors or bipolar automatic switches (BAS) 216. Each BAS 216 may include a pair of electrical contacts that are closed by an actuating mechanism, for example, a solenoid (not shown) or a coil creating a magnetic force that attracts the electric contacts to a closed position. The BAS 216 may include appropriate electrical shielding and anti-spark features that can allow these items to operate repeatedly in a high voltage environment.

When the machine 100 initiates retarding, it is desirable to close both BAS 216 within a relatively short period such that the first resistor grid 214 is placed in circuit between the first and second DC rails to begin energy dissipation rapidly. Simultaneous actuation or actuation at about the same time, such as, within a few milliseconds, of the pair of BAS 216 may also advantageously avoid charging the first resistor grid 214 and other circuit elements to the voltage present at the rails of the DC link 312. The pair of BAS 216 also prevents exposure of each of the BAS 216 or other components in the system to a large voltage difference (the voltage difference across the DC link 312) for a prolonged period. A diode 334 may be disposed in parallel to the first resistor grid 214 to reduce arcing across the BAS 216, and also electrically isolate the first resistor grid 214 from the DC link 312 during a propel mode of operation.

When the machine 100 is retarding, a large amount of heat can be produced by the first resistor grid 214. Such energy, when converted to heat, must be removed from the first resistor grid 214 to avoid an overheating condition. For this reason, a blower 338, driven by a motor 336, operates to convectively cool the first resistor grid 214. There are a number of different alternatives available for generating the power to drive the motor 336. In this embodiment, a DC/AC inverter 340 is arranged to draw power from voltage-regulated locations across a portion of the first resistor grid 214. The DC/AC inverter 340 may advantageously convert DC power from the DC link 312 to 3-phase AC power that drives the motor 336 when voltage is applied to the first resistor grid 214 during retarding.

In the illustrated embodiment, the BAS 216 are not arranged to modulate the amount of energy that is dissipated through the first resistor grid 214. During retarding, however, the machine 100 may have different energy dissipation requirements. This is because, among other things, the voltage V in the DC link 312 should be controlled to be within a predetermined range. To meet such dissipation requirements, the second resistor grid 218 can be exposed to a controlled current during retarding through action of the chopper circuit 220. The chopper circuit 220 may have any appropriate configuration that will allow modulation of the current supplied to the second resistor grid 218. In this embodiment, the chopper circuit 220 includes an arrangement of transistors 342 that can, when actuated according to a desired frequency and/or duration, modulate the current passed to the second resistor grid 218. This controls the amount of energy dissipated by the second resistor grid 218 during retarding. The chopper circuit 220 may additionally include a capacitor 344 that is disposed between the first and second rails of the DC link 312 and that regulates the voltage input to the chopper circuit 220. A switched diode 346 may be connected between the second resistor grid 218 and the DC link 312 to protect against short circuit conditions in the DC link 312 and to provide a device that can deactivate the DC link 312, for example, during service.

The passage of current through the second resistor grid 218 will also generate heat, necessitating cooling of the second resistor grid 218. In this embodiment, the first and second resistor grids 214 and 218 may both be located within the blower housing 116 (also shown in FIG. 1A and FIG. 2) for convective cooling when the motor 336 and blower 338 are active.

The embodiment for a drive system shown in FIG. 4 includes other components that are discussed for the sake of completeness. Such components are optional but are shown herein because they promote smooth and efficient operation of the drive system. In this exemplary embodiment, a leakage detector 348 is connected between the two resistors 321, in parallel with a capacitor 349, to the first and second rails of the DC link 312. The leakage detector 348 detects any current leakage to ground from either of the first and second rails of the DC link 312. Further, in one embodiment, a first voltage indicator 350 may be connected between resistors 352 across the first and second rails of the DC link 312. The first voltage indicator 350 may be disposed between the rectifier 206 and the retarder arrangement 213 such that a high voltage condition may be detected. In a similar fashion, a second voltage indicator 354 may be connected between resistors 356 across the first and second rails of the DC link 312. The second voltage indicator 354 may be disposed between connection nodes 353 that connect to the drive motors 210 and the inverter circuit 208 to detect a voltage condition occurring during, for example, a bus bar fracture where the DC link 312 is not continuous, in order to diagnose whether the inverter circuit 208 is operating.

Figure 5:
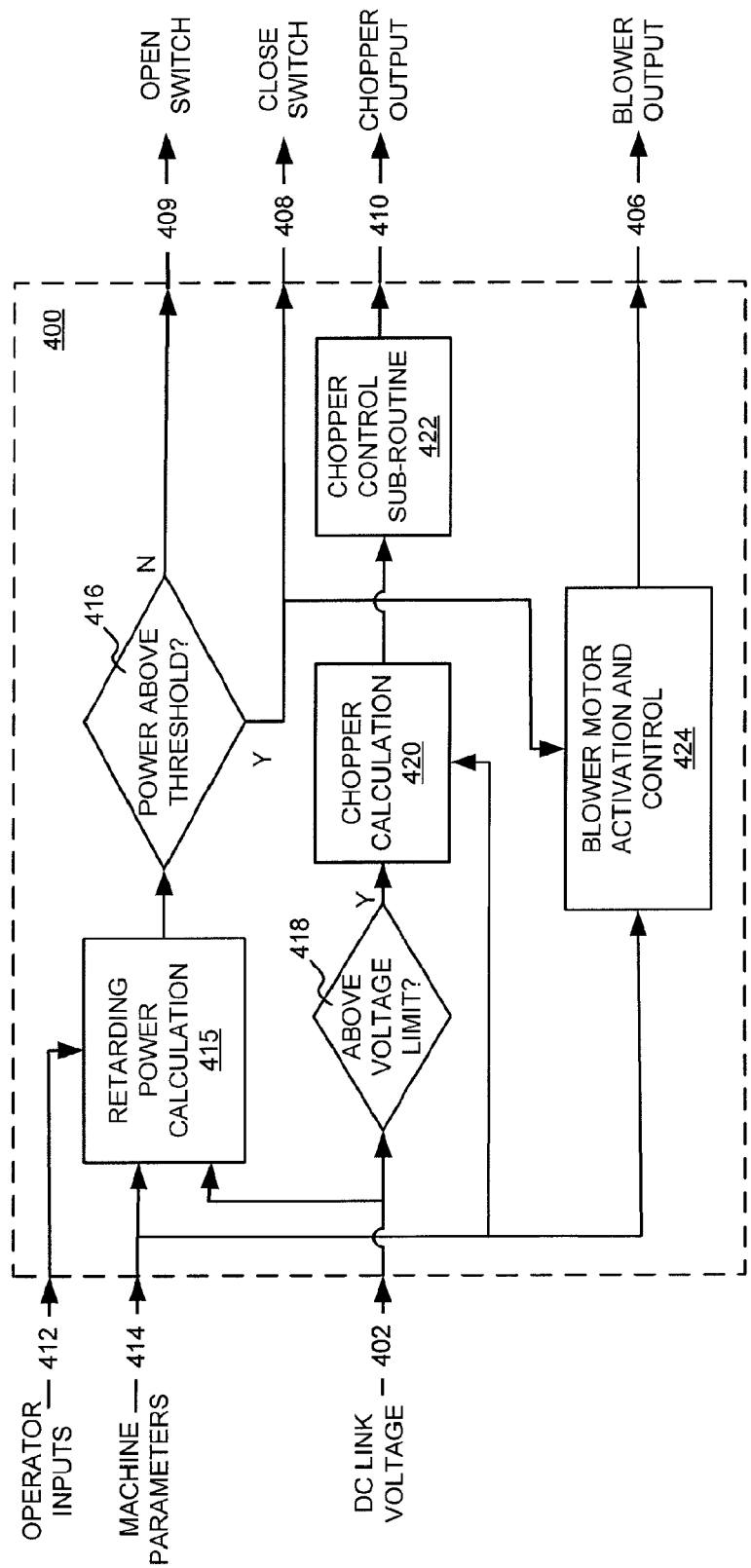
FIG. 5 is a block diagram for a controller in accordance with the disclosure.

A block diagram representation of an electronic controller used in the drive system is shown in FIG. 5. The electronic controller may be a single controller or may include more than one controller disposed to control various functions and/or features of a machine. For example, a master controller, used to control overall operation of the machine, may be cooperatively implemented with a motor or engine controller, used to control the engine 202. In this embodiment, the term "controller" is meant to include one, two, or more controllers that may be associated and that may cooperate in controlling various functions and operations of the machine 100 (FIG. 1A). Accordingly, various interfaces of the controller are described relative to components of the drive system shown in the block diagram of FIG. 3, but these interfaces are not intended to limit the type and number of components that are connected, or the number of controllers that are described.

As shown in FIG. 5, an electronic controller 400 is disposed to receive a voltage input at a node 402. The voltage input present at node 402 is indicative of the instantaneous voltage difference present across the first and second rails of the DC link 312 (FIG. 3). This value may be measured, for example, by the voltage transducer 314. The controller 400 may be capable of commanding or controlling the operation of various components and systems of the machine 100. For example, the controller 400 may have a blower motor output node 406 that is arranged to send a signal to the motor 336 and/or the DC/AC inverter 340 (FIG. 4), which signal can be inclusive of information on the speed and duration of the motor's operation. The controller 400 further includes two switch output nodes 408 and 409 that are arranged to command the BAS 216 (FIG. 4) to close or open, respectively. The controller 400 may also include a chopper duty output node 410 that is arranged to provide information to the chopper circuit 220 (FIG. 4), which information is indicative of a relative reduction in the voltage of the DC link 312 that is required across the chopper circuit 220.

The controller 400 may further include an operator input node 412 as well as a machine operating parameter input node 414. The operator input node 412 may carry information relative to the initiation and extent of retarding desired by the operator. The operating parameter node 414 communicates information indicative of one or more operating parameters of the machine, such as, machine speed, engine speed, generator speed, payload, resistor grid temperature, and so forth.

During operation, the controller 400 is advantageously capable of controlling the extent and timing of retarding for the machine 100, depending on the desired machine operation the operator is commanding. Such control is desirable because the DC link voltage should remain within a certain range during operation. Malfunction or failure might result if the DC link voltage increases above the limitations of the system, such as, in a condition when inadequate excess power is dissipated during retarding. Alternatively, such conditions may arise if the DC link voltage decreases below a minimum value when excessive power is dissipated. Hence, it is desirable to control retarding energy dissipation, which can still deliver the desired performance of the machine.

To accomplish this balance between power dissipation and control of the voltage of the DC link, the controller 400 may first perform a calculation or determination of the amount of power, expressed, for example, in kW, that should be dissipated during each retarding command. Information indicative of the extent of vehicle deceleration or retarding may be obtained from the operator input node 412 and used in a calculation function 415. The calculation function 415 may also consider the desired and actual speed of the machine, payload, and so forth, in determining the amount of energy that should be dissipated.

The result of the calculation function 415 may be compared to a threshold value 416. The threshold value 416 may represent a maximum amount of energy dissipation that can safely be conducted through at least one resistor grid, for example, the first resistor grid 214, below a certain DC link voltage. If the result of the calculation function 415 is above the threshold value 416, for example, more than 250 kW, then the controller 400 may command the BAS 216 (FIG. 4) to close by activating the switch output node 408. In the illustrated embodiment, this is accomplished by sending an appropriate signal through the switch output node 408. This signal will remain active until the desired retarding has been achieved or until the remaining retarding command falls below the threshold of 250 kW.

At times when a retarding command is given and the result of the calculation at 415 indicates that the magnitude of the retarding command is less than the threshold, the controller 400 will command the BAS 216 (FIG. 4) to open via node 409 or to remain open. In such instances, the machine may be retarding by not commanding the electric drive motors to propel the machine. Any energy generated by the motors may begin collecting in the drive system. Such collection of energy in the system will cause the voltage in the DC link to increase. During the time while retarding energy is collecting in the drive system, thus increasing the voltage, the machine does not dissipate retarding energy in the resistor grids as long as the magnitude of such retarding energy is below the threshold at 416.

When the voltage in the DC link has sufficiently increased such that it exceeds a threshold or limit at 418, it becomes desirable to actively control the voltage developed at the DC link. In such instances, the controller 400 may perform a chopper calculation 420 based on the voltage in the DC link and, optionally, based on several other variables as well. Such other variables may include a machine operating parameter indicative of the power input to the system, such as the revolutions per minute (RPM) of the engine 202 or generator 204 (FIG. 3), the current of the DC link, the excitation current of the generator, the desired retarding, and other parameters. Based on these parameters, a chopper calculation 420 can determine an optimum setting for the choppers. This determination may be input into a chopper control sub-routine 422, which may generate an appropriate signal in the chopper duty output node 410. The signal at node 410 commands the chopper circuit 220 (FIG. 4) to adjust the power passing through the second resistor grid 218 (FIG. 4) appropriately. The controller 400 may operate to control or adjust the chopper circuit 220 (FIG. 4) alone, or optionally in addition to a command to close the BAS 216 (FIG. 4). Such control may be implemented in a closed-loop fashion to maintain the DC link voltage below a limit.

The controller 400 may be further capable of controlling the operation of a blower that operates to cool one or more resistor grids. An example of such an arrangement is shown in FIG. 4, where the AC motor 336 operates the blower 338 to convectively cool the first and second resistor grids 214 and 218. In the embodiment of FIG. 4, appropriate commands sent to an arrangement of transistors that control the frequency of an AC signal being generated at the DC/AC inverter 340 activates the blower and controls its speed. The controller 400 may generate an appropriate control signal for the blower motor at the blower motor output node 406, which signal may be based on thermal requirements of the system. In the embodiment shown, the blower motor may be activated when the first resistor grid is active and/or when other activation criteria have been satisfied. This determination, which is denoted in FIG. 5 as 424, may be based on machine parameters, such as the temperature of the resistor grid(s) or other parameters. Other cooling strategies may be employed as well.

Figure 6:
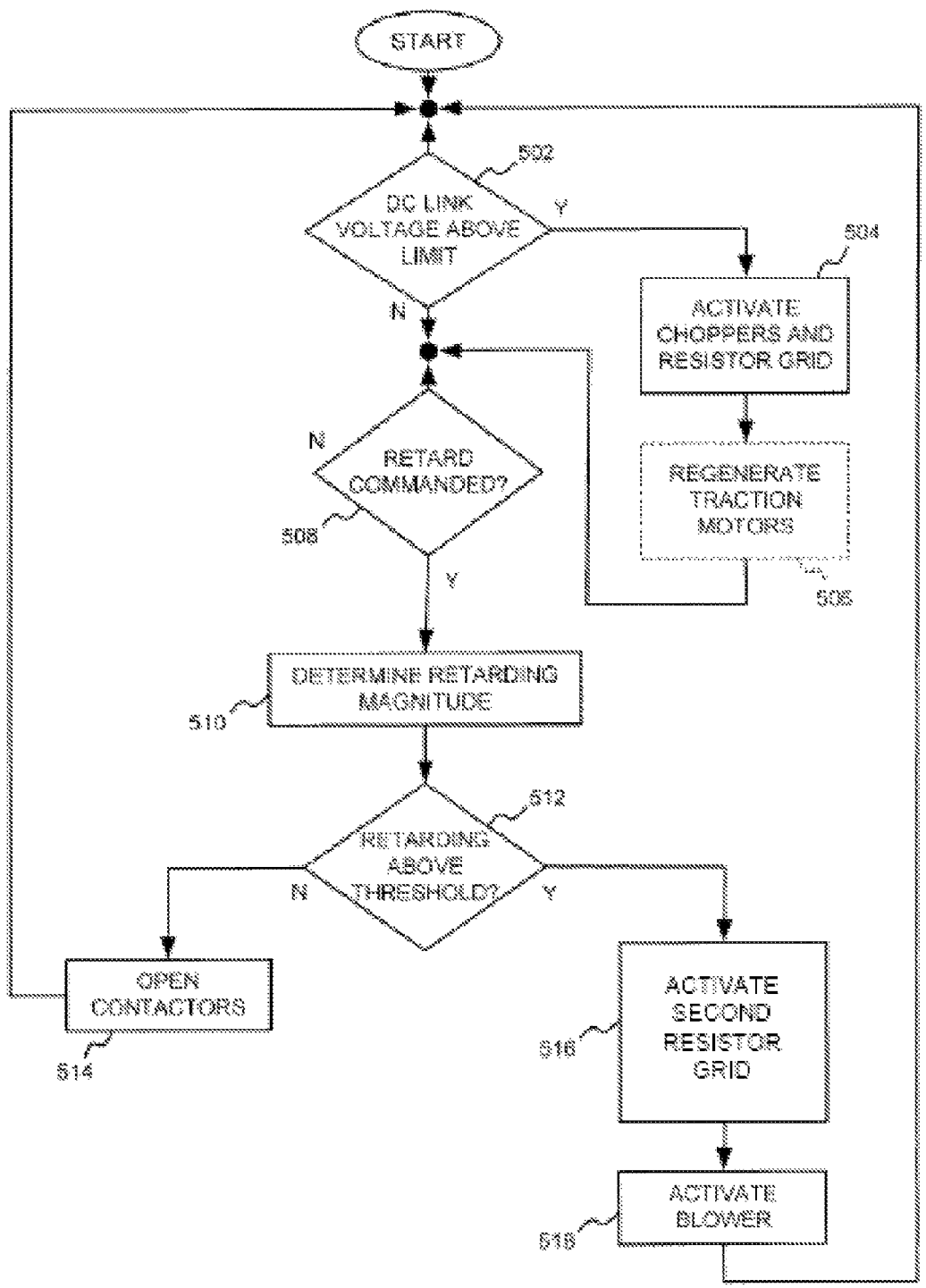
FIG. 6 is a flowchart for a method of retarding an electric drive machine in accordance with the disclosure.

A flowchart for a method of controlling the retarding in an electric drive machine is shown in FIG. 6. The method is initiated with a determination at 502 of whether the voltage in the DC link is above a limit or threshold. If the voltage in the DC link is determined to be above the limit at 502, the voltage is regulated or reduced by activating the chopper circuit at 504 and its respective resistor grid to dissipate energy in the form of heat. Such energy dissipation will result in reducing the voltage in the DC link. Optionally, one or more electric drive motors may be regenerated in 506 to provide a control for increasing the voltage in the DC link such that a closed loop control algorithm may be employed. In so doing, the voltage may be adjusted within an optimum range for retarding, for example, at about a 50% level compared to normal operation of the machine The process continues with a determination of whether a retarding request is received in an electronic controller at 508. This request may be in the from of a signal generated by a manual control of the operator, or it may be a machine generated signal, for example, a speed governor. The signal is interpreted into a parameter indicative of the magnitude of retarding at 510. This interpretation may be based on various machine parameters, for example, current speed of the machine, desired speed after retarding, payload of the machine, condition of the engine and generator, voltage in the DC link, and so forth.

After the determination of the extent of retarding has been completed, the process may determine whether the retarding request is below or above a threshold at 512. For retarding requests that fall below the threshold, the process continues with a command to open the contactor switches, for example, the BAS 216 (FIG. 4), if required, at 514, and then the entire process is repeated. If the retarding request is above the threshold at 512, the process may activate one or more switches or contactors at 516, which will activate a different or second resistor grid. Activation of the second resistor grid may enable the activation of a blower at 518, which is powered by electrical power passing through the second resistor grid and which operates to remove heat therefrom. Following the closing of the contactor switches, the process may repeat.

INDUSTRIAL APPLICABILITY

The industrial applicably of the methods and systems for braking machines described herein will be readily appreciated from the foregoing discussion. The present disclosure is applicable to many machines and many environments. One exemplary machine suited to use of the disclosed principles is a large off-highway truck, such as a dump truck. Exemplary off-highway trucks are commonly used in mines, construction sites and quarries. The off-highway trucks may have payload capabilities of 100 tons or more and travel at speeds of 40 miles per hour or more when fully loaded. The trucks operate in a variety of environments and must be able to negotiate steep inclines in dry or wet conditions.

Similarly, the methods and systems described above can be adapted to a large variety of machines and tasks. For example, backhoe loaders, compactors, feller bunchers, forest machines, industrial loaders, skid steer loaders, wheel loaders and many other machines can benefit from the methods and systems described.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A retarding system for an electric drive machine having an engine that powers a generator, a rectifier connected to the generator, an inverter, and at least one drive motor connected to the inverter, the retarding system comprising:
   a direct current (DC) link connected to the rectifier and the inverter and including a first DC rail at a first voltage and a second DC rail at a second voltage;
   a first contactor switch in electrical communication with the first DC rail;
   a second contactor switch in electrical communication with the second DC rail;
   a first resistor grid connected in series between the first contactor switch and the second contactor switch;
   a controller disposed to selectively actuate the first contactor switch and the second contactor switch to conduct a waste current through the first resistor grid between the first DC rail and the second DC rail, the waste current being generated by the at least one drive motor when a motion of the electric drive machine is retarded;
   an inverter circuit disposed in parallel electrical connection with a portion of the first resistor grid having a resistance that is less than a grid resistance of the first resistor grid, wherein the inverter circuit is configured to control a frequency of an alternating current (AC) voltage being generated in response to a blower command provided by the controller, and wherein the inverter circuit is arranged to convert a DC voltage that is present across the portion of the first resistor grid into the AC voltage;
   an AC motor electrically connected to the inverter circuit and configured to operate at a variable speed in response to the frequency of the AC voltage;
   a blower connected to the AC motor;
   a chopper circuit connected to the first DC rail, and a second resistor grid connected between the chopper circuit and the second DC rail, wherein the chopper circuit is arranged to selectively control a voltage difference applied to the second resistor grid; and
   a switchable diode disposed in series with the second resistor grid and in parallel with the chopper circuit between the first DC rail and the second resistor grid, the switchable diode being selectively connectable between the second resistor grid with the first DC rail continuously to equalize the first and second voltages and thus deactivate the DC link during service;
   wherein the blower is arranged to provide convective cooling of the first resistor grid when the AC motor is operating.

2. The retarding system of claim 1, wherein the voltage difference is between a value of zero and a difference between the first voltage and the second voltage.

3. The retarding system of claim 1, further including a blower housing disposed around the blower and the first resistor grid.

4. A machine, comprising:
   an engine having an output;
   a generator connected to the output of the engine and disposed to provide a generator output;
   a rectifier connected to the generator;
   an inverter connected to the rectifier;
   a direct current (DC) link connected to the rectifier and the inverter defining a first rail and a second rail;
   at least one motor connected to the inverter, the at least one motor connected to at least one drive wheel;
   a first contactor switch connected to the first rail of the DC link;
   a second contactor switch connected to the second rail of the DC link;
   a first resistor grid connected in series between the first contactor switch and the second contactor switch;
   an inverter circuit disposed in parallel electrical connection with a portion of the first resistor grid having a resistance that is less than a grid resistance of the first resistor grid, wherein the inverter circuit is arranged to convert a DC voltage that is developed across the portion of the first resistor grid into an alternating current (AC) voltage having a variable frequency, wherein the variable frequency is determined based on a command signal provided by an electronic controller associated with the machine;
   an AC motor electrically connected to the inverter circuit and disposed to operate at a variable speed by receiving the AC voltage;
   a chopper circuit connected to the first DC rail, and a second resistor grid connected between the chopper circuit and the second DC rail, wherein the chopper circuit is arranged to selectively control a voltage difference applied to the second resistor grid; and
   a switchable diode disposed in series with the second resistor grid and in parallel with the chopper circuit between the first DC rail and the second resistor grid, the switchable diode being selectively connectable between the second resistor grid with the first DC rail continuously to equalize the first and second voltages and thus deactivate the DC link during service;
   wherein a flow of power is defined from the generator, to the rectifier, to the inverter, and to the at least one motor when the machine is in a propel mode, and
   wherein a waste power flow path is defined, at least partially, from the at least one drive wheel, through the at least one motor, the inverter, the first contactor switch, the second contactor switch, the first resistor grid, the inverter circuit, and the AC motor when the machine is in a retarding mode, the machine further including a blower connected to the AC motor operable to provide convective cooling to the first resistor grid.

5. The machine of claim 4,
wherein the chopper circuit selectively controls a voltage developed across the second resistor grid between a value of zero and a DC link voltage when the machine is in the retarding mode.

6. The machine in claim 5, wherein the second resistor grid is coupled with the first rail when the switchable diode is actuated.

7. The machine of claim 4, wherein the electronic controller is further disposed to selectively actuate at least one of the first contactor switch, the second contactor switch, the rectifier, the inverter, and the AC motor.

8. The machine of claim 4, wherein the generator is a three-phase alternating current (AC) synchronous generator having a brushless, wound rotor.

9. A method of retarding an electric drive machine having a DC link voltage present between a first DC rail and a second DC rail, comprising:
determining a magnitude of a retarding command;
comparing the magnitude to a threshold value; and
activating two contactor switches and conducting a current through a resistor grid while the magnitude exceeds the threshold value, further comprising activating a blower powered by an alternating current (AC) motor at a selectively variable speed that depends, at least in part, on the magnitude of the retarding command, the blower disposed to receive AC electrical power from an inverter circuit that is electrically connected to a portion of the resistor grid having a resistance that is less than a grid resistance of the resistor grid;
providing a chopper circuit connected to the first DC rail, and a second resistor grid connected between the chopper circuit and the second DC rail, and selectively controlling a voltage difference applied to the second resistor grid with the chopper circuit; and
providing a switchable diode disposed in series with the second resistor grid and in parallel with the chopper circuit between the first DC rail and the second resistor grid, and selectively connecting the second resistor grid with the first DC rail continuously to equalize the first and second voltages and thus deactivate the DC link during service.

10. The method of claim 9, wherein activating the two contactor switches includes ensuring that the two contactor switches are activated at about the same time.

11. The method of claim 9, further including controlling the voltage of the DC link by controlling the current conducted through the second resistor grid with a selective duty cycle command of the chopper circuit.

12. The method of claim 9, further including operating an electronic controller that is disposed to receive the retarding command, determine the magnitude of the retarding command, activate the chopper circuit, activate an inverter to regenerate at least one traction motor, and activate the two contactor switches.

13. The method of claim 9, further including generating electrical power with at least one traction motor, the electrical power tending to increase the voltage in the DC link when the electric drive machine is in a retarding mode.

* * * * *